May 5, 1970  R. E. BOWLES  3,509,778
GYROSCOPIC FLUID CONTROL DEVICE
Filed Jan. 12, 1962  3 Sheets-Sheet 1

INVENTOR
ROMALD E. BOWLES

BY S. J. Rotondi, A. J. Dupont,
F. E. McGee & R. C. Lucke

May 5, 1970 R. E. BOWLES 3,509,778
GYROSCOPIC FLUID CONTROL DEVICE
Filed Jan. 12, 1962 3 Sheets-Sheet 2

INVENTOR
ROMALD E. BOWLES

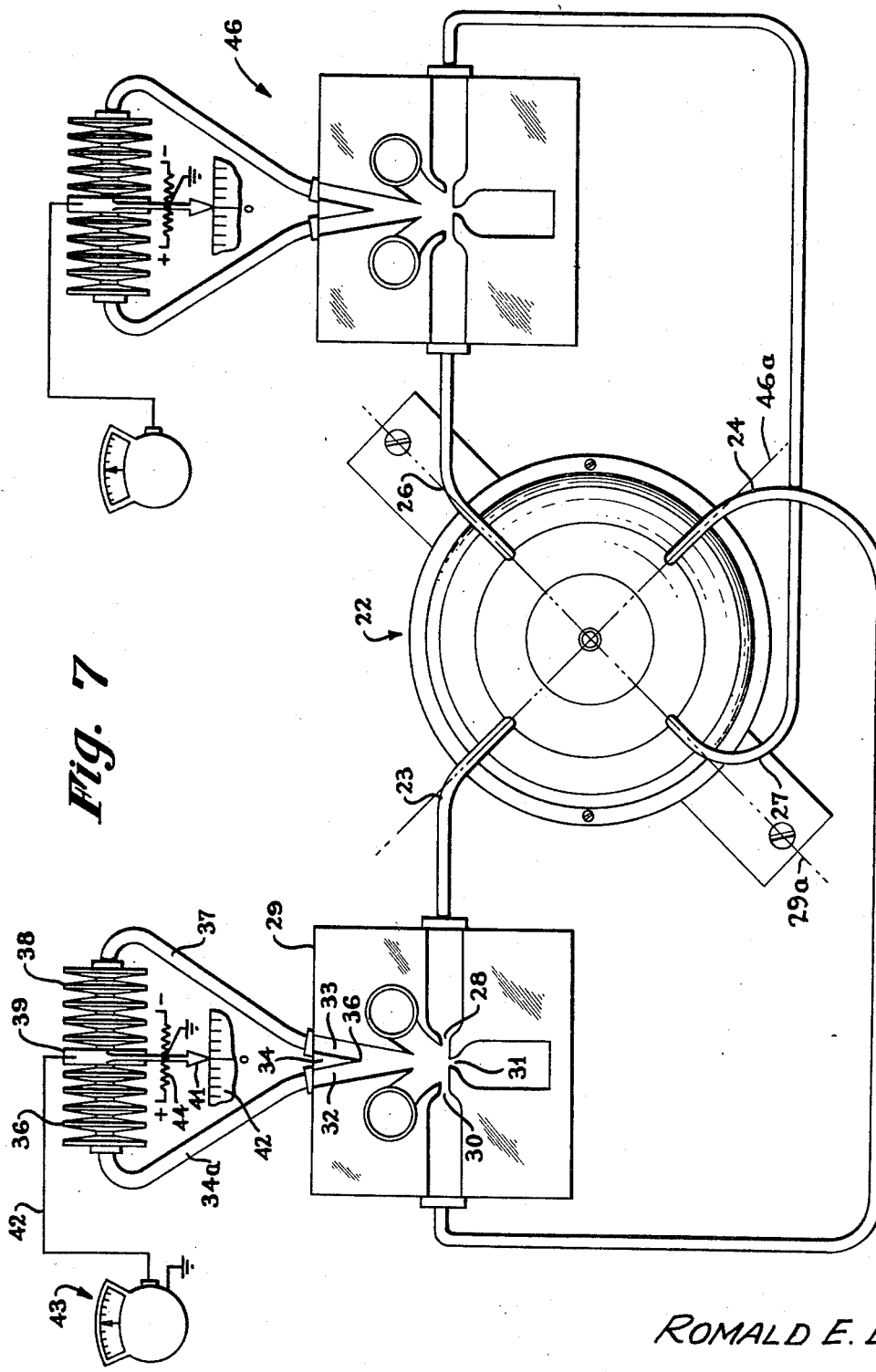

3,509,778
GYROSCOPIC FLUID CONTROL DEVICE
Romald E. Bowles, Silver Spring, Md., assignor to the
United States of America as represented by the Secretary of the Army
Filed Jan. 12, 1962, Ser. No. 166,478
Int. Cl. G01c *19/28*
U.S. Cl. 74—5.6                                    10 Claims The invention described herein may be manufactured and used by or for the Government for governmental purposes without the payment to me of any royalty thereon.

The present invention relates to position measuring devices and, more particularly, to a position measuring apparatus employing a fluid vortex amplifier to accelerate a fluid to such high velocities that the fluid exhibits gyroscopic properties.

The fluid vortex amplifier of the general type utilized in the present invention is described in the copending application of Romald E. Bowles and Billy M. Horton entitled "Fluid Amplifier," filed on Aug. 11, 1960, and assigned Ser. No. 49,061. The fluid vortex amplifier described in the copending application utilizes the flow of fluid, fluid characteristics, and fluid flow characteristics to amplify a fluid input signal. The fluid employed may be a liquid, a gas, a mixture of liquid and gas, or combinations wherein different fluids are employed in different sections of the amplifier. Fluids at cryogenic temperature have advantage due to low viscosity characteristics.

To understand the operation of a fluid vortex amplifier, consider a circular pan of liquid provided with a small discharge hole at the bottom center. The height of the liquid in the pan results in a hydrostatic pressure tending to force the fluid out of the small centrally located discharge hole. In the case of irrotational flow; that is, completely radial flow as opposed to circumferential flow, the fluid flows radially towards and through the discharge hole. However, if a tangential component of velocity is imparted to the fluid immediately adjacent to the rim of the pan, a fluid annulus rotates as a whole about the discharge hole as an axis. It has been shown mathematically in numerous textbooks that as this annulus shrinks toward the centrally located hole or outlet, the tangential velocity component $V_t$ for simple rotational flow is related to the radial position of the annulus by the equation $$V_t = \frac{\text{Constant}}{R} \quad (1)$$

where R represents the radius of the annulus at a particular time and $V_t$ represents the tangential velocity of the fluid at this radial location. It is apparent from Equation 1 that when the fluid is discharging from the pan through the small centrally located hole, as fluid moves from the rim towards this hole, the tangential velocity of the fluid increases as the radial position decreases. Under ideal conditions, if one starts with a ten-inch diameter pan discharging through a centrally located hole of .01 inch diameter, the tangential velocity component at the discharge hole would be one thousand times the tangential velocity component at the rim of the pan. Thus, the tangential velocity component is amplified.

While an open pan of liquid has been employed to describe, in elementary fashion, the operation of a vortex amplifier, preferred embodiments of the invention of the copending application employ a closed container or vortex chamber wherein liquid or gas or mixtures thereof may be employed as the fluid in the system and where the source of pressure causing the fluid discharge need not be derived from gravitational effects but may be due to initial pressurization of the vortex chamber or preferably to a replenishing flow of fluid or fluids into the vortex chambers at a radius or radii different from and greater than the discharge radius.

The device of the present invention may be employed to measure the amount of rotation of an object about an axis and preferably is employed to measure the amount of rotation of a missile, other airborne or waterborne vehicle or other objects movable in space relative to a base reference about one of its principal axes. It is common practice in the control of missiles, aircraft, surface vessels and submarines to employ gyroscopic devices for measuring the rotation of these vehicles about one or more of their principal axes; these being the roll axis which is the axis along its longitudinal center line, the pitch axis which is the central axis in the horizontal plane extending perpendicular to the roll axis, and the yaw axis which is the vertical axis perpendicular to and intersecting the pitch and roll axes.

In known conventional gyroscopic systems, three gyroscopes may be provided, each having the axis of rotation of its rotating mass aligned with a different one of the three axes of the vehicle, or two such devices may be employed with one of these detecting rotation about any two of the three axes. Upon rotation of the vehicle relative to one of these axes, its associated gyroscope spin axis remains stationary in space and the amplitude and sense of deviation between this spin axis and the vehicle axis permits direct or indirect measurement of the degree and direction of rotation (other than rotation about this spin axis) of the vehicle relative to this axis. A vast quantity of art has been built up concerning systems for utilizing this information for stabilizing an aircraft, missile, etc., along a particular path of travel. Normally, these signals are applied to several systems for operating the various control members related with each of these axes so as to return the vehicle to its initial position or attitude relative to each of the three axes, or to adopt a new orientation relative to each of the three axes.

There are two classes of gyroscopic devices in widespread use today, these being position and rate gyros. The position gyro provides information indicating the actual angular position of the vehicle relative to a desired angular position and a control mechanism utilizes these signals, usually in a servo loop, to produce counter rotation of the vehicle until the error signal generated by the gyroscopic device is substantially reduced to zero. In a rate gyroscope, the rate of change of the position of the vehicle relative to its initial position is measured. This rate signal may be utilized to adjust the control members of the vehicle to terminate rotation, the amount and sense of control being a function of the amplitude and sense of the rate signal.

In most gyroscopic systems employed to date, both position and rate signals are generated, it being well known in the servo art that in systems employing both of these signals, substantially stable operation of the apparatus may be obtained. The position and rate signals may be provided by distinct gyroscopic devices or a position gyroscope may be employed with a circuit having a means for differentiating the position signal and for combining the differentiated signal with the original position signal to provide all of the necessary information. Conversely, a rate gyro may be employed with a circuit providing for integration of the rate signals either continuously or sometimes over predetermined time intervals, the integrated and rate signals being combined to provide a final error signal which may be employed by the apparatus to provide a substantially completely stable control system.

The present invention relates primarily to a position measuring gyroscopic device which is adapted to measure the amount and sense of rotation of a body about two axes mutually perpendicular to the axis of rotation of a fluid rotated at a rate such that the mass of fluid exhibits gyroscopic properties. It is known that a gyroscopic effect may be obtained from a rapidly rotating body of liquid and that, if an attempt is made to rotate the container in which the liquid is disposed about an axis perpendicular to the axis of rotation of the liquid, precession of the liquid body results and indicates the degree and sense of rotation relative to the aforesaid axis. In a prior art gyroscopic device, known to the inventor, a body of rapidly rotating liquid forming the inertial element thereof, is constrained and therefore the apparatus operates as a rate gyroscope. Rotation of the fluid, which is stated to be mercury, is obtained by means of a rapidly rotating magnetic field so that, in effect, the fluid serves as the rotor of an electrodynamic device. The disadvantage with the prior art device described immediately above is that the magnetic structure for producing the rotating magnetic field must be quite powerful to produce the high velocities required and therefore the apparatus consumes a considerable amount of energy and is, in addition, quite bulky and cumbersome. Further, the rate at which the rotating liquid may be brought up to speed is relatively slow which is a disadvantage in any system of this type. Further, the choice of fluid is limited by the electromagnetic requirements of the drive.

It is an object of the present invention to provide a gyroscopic device for measuring rotational position of an object relative to an axis thereof which device employs a body of rapidly rotating fluid in which rapid rotation of the fluid is obtained as a result of rotational velocity and amplification in a fluid vortex amplifier.

It is an other object of the present invention to provide a gyroscopic position measuring device employing a rapidly rotating mass of fluid as an inertial element, which apparatus requires no moving parts in addition to the mass of rotating fluid and a source of pressure difference for producing flow of fluid and in which the high velocities required are achieved as a result of application inherent in a fluid vortex amplifier.

It is still another object of the present invention to provide a gyroscopic position measuring apparatus employing a rapidly rotating body of fluid, which apparatus is adapted to measure rotation of a vehicle about two mutually perpendicular axes perpendicular to the axis of rotation of the fluid.

The above and still further objects, features and advantages of the present invention will become apparent upon consideration of the following detailed description of one specific embodiment thereof, especially when taken in conjunction with the accompanying drawings, wherein:

FIG. 7 is a diagram illustrating a system for measuring the output signals derived from the apparatus of the present invention and interpreting these signals as amount and sense of rotation about predetermined axes thereof.

Figure 1:
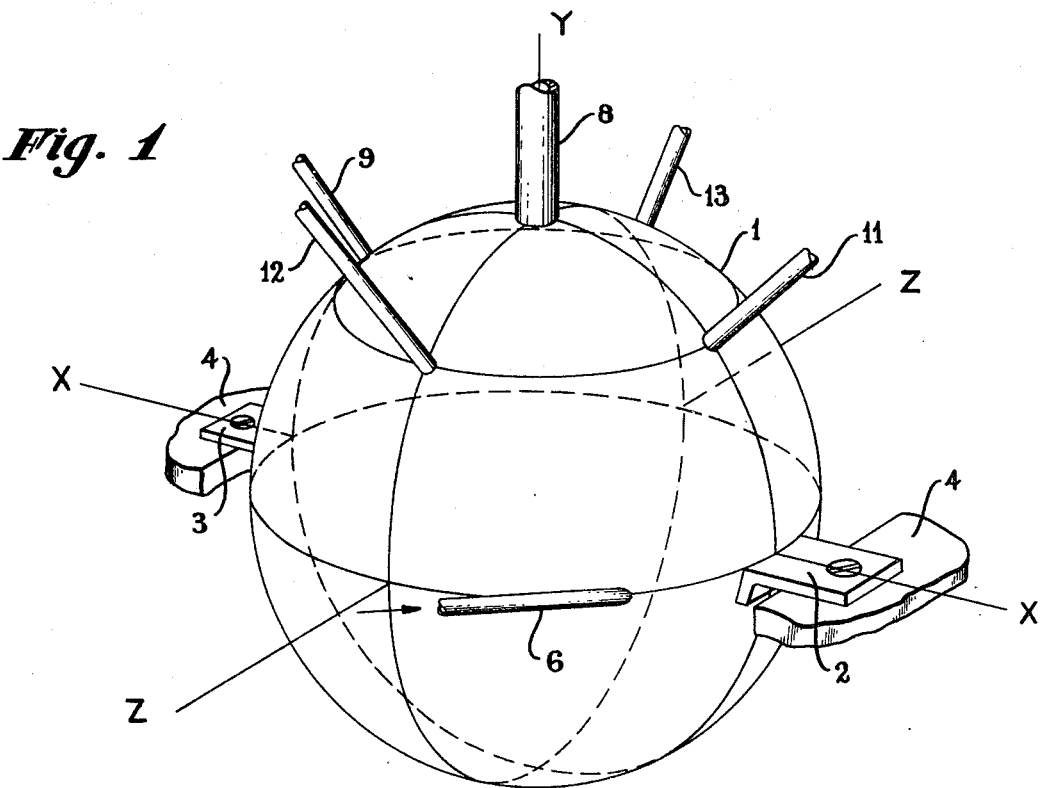
FIG. 1 is a perspective view in elevation of the apparatus of the present invention.
Figure 2:
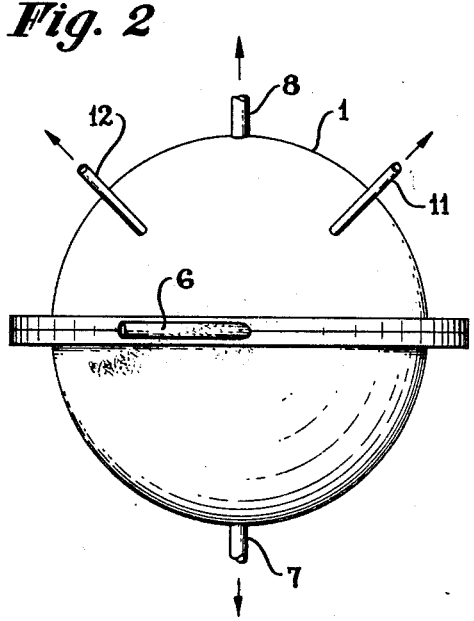
FIG. 2 is a view in elevation of the apparatus illustrated in FIG. 1.
Figure 3:
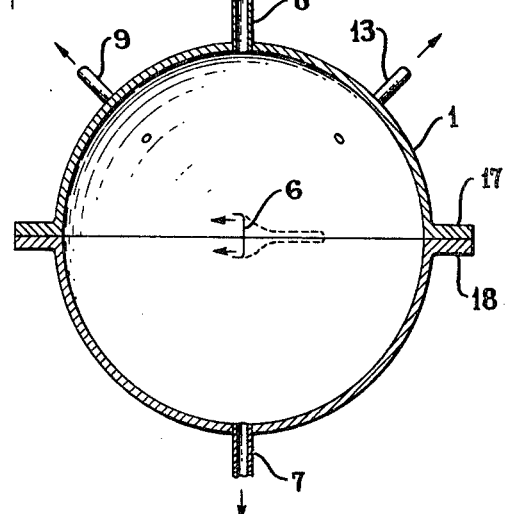
FIG. 3 is a sectional view in elevation of the apparatus of the present invention.

Referring now specifically to FIGS. 1 through 3, of the accompanying drawings, there is illustrated a position-measuring, gyroscopic apparatus comprising a hollow, generally spherical body 1 having secured along its equatorial plane a pair of diametrically opposed mounting brackets 2 and 3. The mounting brackets 2 and 3 are secured, for instance, to the frame 4 of a missile or similar device. A diameter of the equatorial great circle of the sphere 1 passes through the centers of the mounting brackets 2 and 3 and is aligned, for instance, with the pitch axis of the vehicle designated the X axis in FIG. 1, while an axis perpendicular thereto and also on the equatorial plane, is aligned with the roll axis of the vehicle, this being designated as the Z axis. A liquid inlet pipe 6 passes through the wall of the sphere 1 into the interior thereof and discharges fluid through an orifice 6a tangentially to the adjacent interior surface in the equatorial plane, this being the horizontal plane in FIG. 1. Fluid discharges from the sphere 1 through the outlet pipes or tubes 7 and 8 which are coaxial with an axis perpendicular to and intersecting both the X and Z axes, this being the vertical or Y axis of the device.

The hollow, spherical body 1 operates as a fluid vortex amplifier which is governed by Equation 2

$$V_{cd} = \frac{r_i}{r_d} \cdot \eta \cdot V_{ci} \qquad (2)$$

where $r_i$ and $r_d$ are the radical locations with respect to the center of the apparatus of the inlet and discharge apertures, respectively; $V_{cd}$ is the output circumferential velocity; $V_{ci}$ is the input circumferential velocity; and $\eta$ is a nonlinear operator introduced by viscous forces and is approximately equal to one in the absence of viscosity. If the input fluid has a circumferential velocity $V_{ci}$, the corresponding circumferential velocity of the fluid at the outlet pipes 7 and 8 is equal to $V_{cd}$ and is ideally amplified by the ratio of the radii of the locations of the input and output passages or pipes. It may be also be shown that angular rotational velocities in a vortex amplifier are governed by Equation 3

$$W_d = \left(\frac{r_i}{r_d}\right)^2 \cdot K \cdot \eta \cdot W_i \qquad (3)$$

where $W_d$ is the angular rotational velocity of the outfit fluid; $W_i$ is the angular rotational velocity of the input fluid; $\eta$ is the viscosity factor; and K is a constant approximately equal to one. It can be seen from Equations 2 and 3 that the device of FIG. 1 is a multiplier amplifier in which the multiplication factor can be varied as a function of the ratio $r_i/r_d$.

As a result of the aforesaid operation of the fluid vortex amplifier, the fluid interiorly of the body 1, and particularly the fluid near the vertical center line of the device, rotates at a very rapid rate. In the case of the apparatus illustrated; that is, the relative proportions of the radius where the fluid is applied and the radius of the outlet pipes, amplifications of 15 times relative to tangential velocity and 225 times relative to rotational velocities may be obtained. The average potential velocity of the total fluid body is, of course, a function of both the input and output velocities but it has been found that if a fluid is employed, the mass-velocity product is sufficient to produce a gyroscopic action which can be monitored.

In consequence, if the apparatus is rotated about its X axis, as illustrated in FIG. 1, the fluid within the hollow sphere continues to rotate about the original Y axis orientation due to the closed angular momentum of the fluid. The sphere is reoriented therefore relative to the spinning fluid as a result of rotation of the sphere about its X axis. As a result, there is developed a differential in pressure at locations in Y–Z plane lying on opposite sides of the pipe 8 or, on the other hand, the pipe 7. In order to measure this differential pressure, there is provided a pair of orifices or pipes 12 and 13 which are let into the interior of the sphere 1 through the walls thereof. The pipes 12 and 13 are disposed along the intersection of the Z–Y plane with the sphere 1 and, for purposes of illustration, are located at the intersections of the outer periphery of the body 1 with radii of the sphere 1 lying at 45° relative to the X–Z plane. Relating the function of the device now to the example given below, if the sphere 1 is rotated about the X axis, a differential in pressure is developed between the pipes 12 and 13. By employing appropriate differential measuring apparatus, as will be described subsequently, this difference in pressure may be interpreted as the degree and sense of rotation of the body about the X axis.

Rotation of the sphere 1 about the Z axis produces a differential pressure which can be monitored in the plane of the X–Y axis and, in order to measure this effect, there are provided opposed pressure sensing orifices or pipes 9 and 11. These pipes are in the same position relative to the horizontal plane as the pipes 12 and 13 but detect differential pressures at the sensing orifices resulting from rotation of the device about the Z axis rather than the X axis. If the new orientation is maintained, the influx of new fluid will gradually erase information as to the old Y axis orientation and establish the new Y axis orientation as the fluid spin axis.

Since the hollow body 1 is secured to the frame of the vehicle and the X and Z axes are aligned with the pitch and roll axes thereof, the body 1 rotates in accordance with pitch and roll of the missile or other vehicle and, in consequence, the apparatus senses rotation of this vehicle relative to the aforesaid axes. As is well known in all position gyroscopic devices, rotation of the body or vehicle about the axis of the rotating mass has no effect upon the device output signal. Therefore, rotation of the vehicle, in the example under consideration, about its yaw axis Y does not of itself produce a differential fluid pressure between pipes 9 and 11 or pipes 12 and 13 respectively, and this rotation cannot be detected by the apparatus of the invention as such a pressure differential. In order to detect such rotation, a second device of the type illustrated in FIG. 1 must be employed and must be positioned such that the axis of rotation of the fluid is perpendicular to the yaw or Y axis of the vehicle. The extra pair of monitor orifices of this unit can be paralleled with one pair of the original device as a cross check monitor.

In order for the apparatus of the invention to serve as a practical position measuring device, the fluid in the system at the time of a change in position of the hollow sphere 1 must tend to remain in its position prior to movement of the sphere 1; that is, the fluid must have a memory of its prior position and tend to retain it. The body 1 is intended, under normal operating circumstances, to maintain a specific position of a vehicle or stable platform relative to its X and Z axes. If this body rotates, a correction must be introduced into the control system of the vehcile or stable platform to cause it to return to is initial position. Since the signal which is employed to produce correction is derived from the apparatus of FIG. 1, the signal must persist for a length of time required to produce correction of the position of the vehicle, body of missile. Thus, the ability of the fluid to maintain its initial position must be sufficient to last, substantially undiminished, throughout the control interval. There are several factors which tend to cause the fluid to change its flow pattern and assume a position in which it rotates about an axis aligned with the pipes 7 and 8 after the body 1 has been moved. These factors are generally the drag exerted on the fluid by the interior walls of the body which is reflected throughout the fluid due to its viscosity, the movement of the inlet pipe 6 relative to the equatorial plane of the body of rotating fluid, and the movement of the discharge pipes 7 and 8 relative to the spin axis of the fluid. Referring to the latter two effects, it is apparent that some influence will be present as a result of movement of both the inlet pipe 6 and outlet pipes 7 and 8. These influences will be greatest immediately adjacent these pipes, and therefore, from this standpoint it is desirable that the output measuring pipes 9, 11, 12 and 13 are located at a distance from pipes 6, 7 and 8. Also the pipes 9, 11, 12 and 13 cannot be located relative to the pipes 7 and 8 such that within the maximum displacement for which the system is designed, the spin axis of the fluid crosses a circle including the inlets to the sensing pipes. However, the maximum signal indicating a relocation of the spin axis is available in a region relatively close to the pipes 7 and 8. Therefore a compromise must be reached between these various factors and the measuring pipes 9, 11, 12 and 13 are normally located at about an 80° angle relative to the equatorial plane. For purposes of clarity, in this embodiment of the device, the output measuring pipes 9, 11, 12 and 13 are illustrated as being located at 45° angles relative to the equatorial axis which locations are approximately half way between the inlet pipe 6 and outlet pipes 7 and 8. As a result of the location of these pipes at the 80° positions, the effects of turbulence and alteration of the flow patterns produced by movement of the inlet and outlet pipes have the smallest possible immediate effect at the sensing positions. The memory interval of the apparatus is now primarily a function of the transit time of the fluid from the pipe 6 to the region of the outlet pipes 7 and 8. By making the sphere 1 of sufficient size, this transmit time may be made sufficient to permit an output signal, under normal conditions, to persist for the time required to complete reorientation of the vehicle or stable platform relative to the axis or axes about which it has rotated. As indicated in the aforesaid copending application of Messrs. Bowles and Horton, a long transit time of a fliud through a vortex amplifier is normally an undesirable effect. However, the present invention utilizes long transit times to permit the control function to persist for the requisite interval and therefore in this particular application becomes an advantage rather than a hindrance.

Referring now to the first factor listed above as effecting memory, general turbulence is produced in the system also as a result of moving the position of the inlet and outlet orifices relative to the spinning body of fluid. The fluid entering the sphere after a change in position thereof establishes a body of rotating fluid whose velocity distribution is different from the body of fluid subsisting in the sphere at the time of movement thereof. In consequence, turbulence develops at the interface between the two bodies of fluid and this effect tends to reduce the memory interval. It has been found that a suitable memory interval is difficult to obtain as a result of turbulence, particularly if the body 1 is a true sphere. However, if one of the axes of the device 1 is elongated or shortened relative to the other axes by a factor of approximately 5 percent or greater, the effects of the interface turbulence is sufficiently small that memory may be maintained for the period of time required to effect correction of the orientation of the vehicle or missile.

It will be noted in the above discussions that turbulence is an important factor in determining memory interval. Turbulence transmitted through the fluid also affects the ability to measure the effect of relocation of the sphere since it produces noise in the form of pressure variations at the sensing pipes. It is apparent that turbulence should be reduced so far as possible. In this respect, operation at cryogenic temperatures is often desirable since the viscosity of the fluid becomes quite small at these temperatures.

Figure 4:
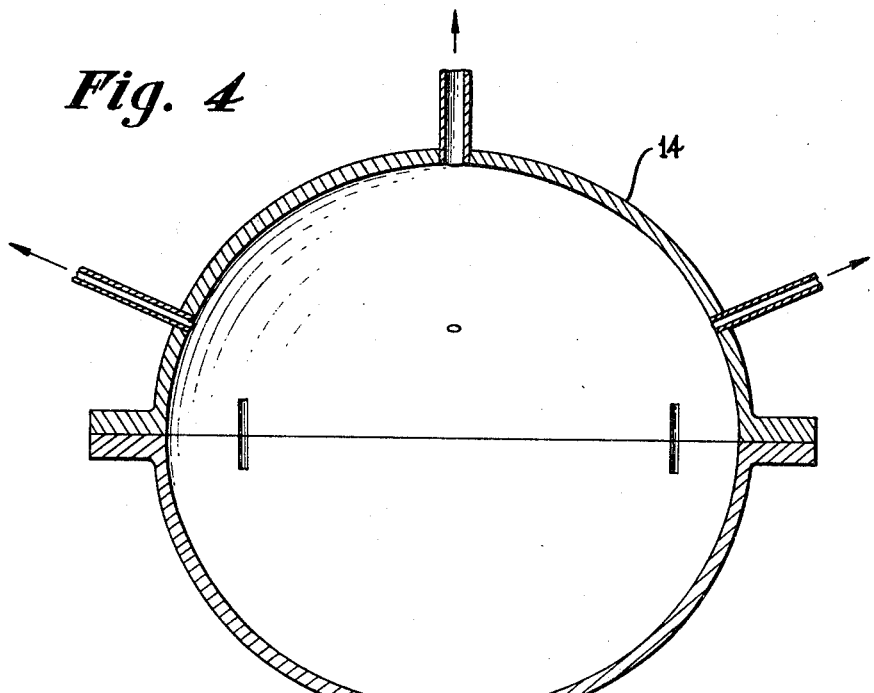
FIG. 4 is a sectional view in elevation of one preferred form of the apparatus of the invention.

Referring specifically to FIG. 4 of the accompanying drawings, a hollow spheroid, designated by reference numeral 14, has its height along the Y axis reduced about 5 percent relative to the equatorial diameter thereof. In this particular case, the device tends toward a flat cylinder of fluid which is known to support continued rotation of a mass of fluid for a considerable period in its original position even with severe interface turbulence. It is not possible to employ a completely flat cylinder since the fluid therein would operate as a constrained mass, and the device would then constitute a rate gyroscope rather than a position gyroscope. Therefore, the degree of flattening cannot be so great that there is any appreciable constraint placed upon the fluid due to rotation of the hollow body relative thereto. The precise limits of flattening are not known, but it is known that a decrease along one of the axes of 5 percent relative to the other axes is sufficient to improve the requisite memory characteristics to the fluid and that the limitation on the degree of flattening is determined by the constraining effect of the device upon the fluid.

Figure 5:
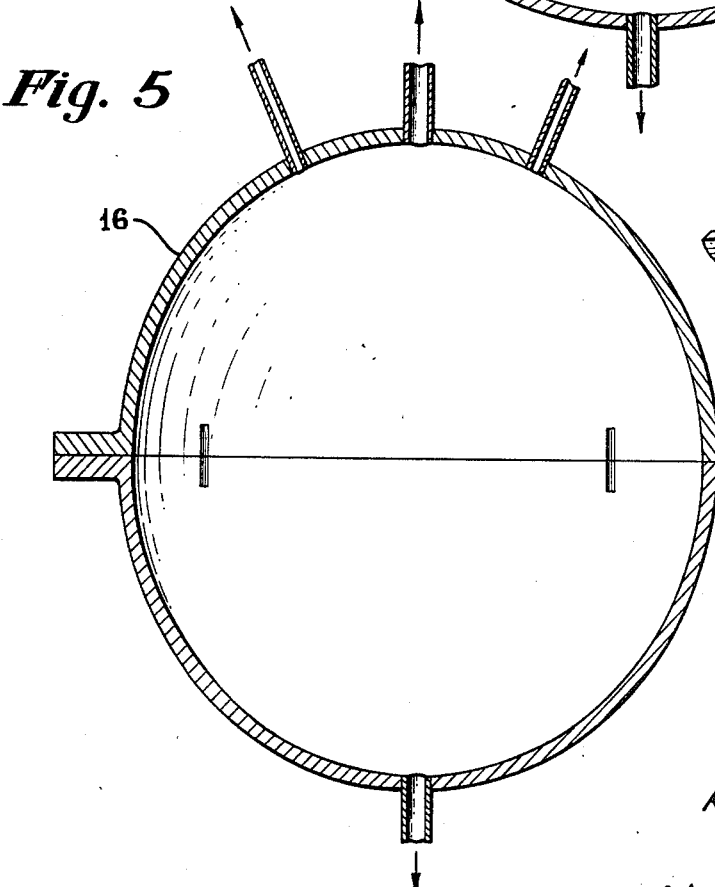
FIG. 5 is a sectional view in elevation of a second preferred form of the apparatus of the invention.

The apparatus illustrated in FIG. 4 is one in which sufficient memory may be obtained while another device in which the requisite memory is obtained is illustrated in FIG. 5. In this particular illustration, a hollow spheroid 16 is provided which is elongated at least 5 percent along its vertical axis relative to its horizontal axes. This apparatus then tends towards an elongated, rather than flat, cylinder, it being known that an elongated cylinder tends to sustain the original flow characteristics of a body of rotating fluid confined therein. Again, a true elongated cylinder cannot be employed since such an arrangement would constrain the fluid and cause the apparatus to operate as the rate gyro. It has been found that a 5 percent elongation along the Y axis is sufficient to provide the requisite memory property but is insufficient to cause great restraint of the fluid and therefore the device operates as a position, rather than a rate, gyro.

Figure 6:
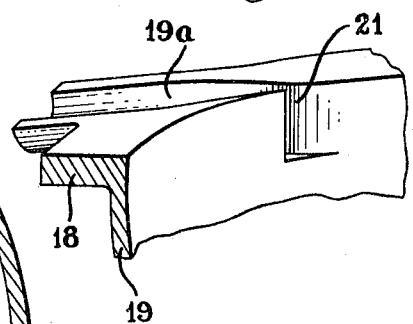
FIG. 6 is a perspective view partially in section of the inlet orifice to the apparatus of the present invention.

It will be noted that the illustration in FIG. 1 is diagrammatic whereas the illustrations in FIG. 2 through 5 are of additional physical embodiments of the device. The hollow sphere illustrated in FIG. 1 is actually obtained by employing hemispheres provided with flanges 17 and 18, respectively, which may be bolted together to form the desired hollow sphere. In order to provide inlet passages along the equatorial axis of the sphere, each hemisphere includes one-half of each inlet passage and mates with the corresponding half passages in the other hemisphere to provide the properly sized and properly positioned inlet passages. This arrangement is illustrated in FIG. 6 which shows an inlet passage through the wall of the lower hemisphere. The passage is in the form of a channel which passes through both the flange 18 and the wall 19 of the lower hemisphere and terminates in a portion 21 such that the flow from this portion is substantially tangential to the interior of the wall 19. As indicated immediately above, a mirror image of this channel arrangement comprising passages 19a and 21 is provided in the upper hemisphere and the device is aligned so that the axes of the passage 19a and nozzle 21 are parallel and aligned with the axes of the corresponding passage and nozzle in the upper hemisphere.

Referring now specifically to FIG. 7 of the accompanying drawings, there is illustrated a system for measuring and indicating the rotation of the vehicle relative to those of its axes aligned with the X and Z axes of the apparatus illustrated in FIG. 1. The apparatus is provided with a position-measuring, gyroscopic device 22 of the type illustrated either in FIGS. 1, 4 or 5 having outlet pipes 23, 24, 26 and 27. The outlet pipes 23 and 24 are aligned in a plane normal to the pitch axis 29a of the apparatus while the pipes 26 and 27 lie in a plane normal to the roll axis 46a of the missile or other vehicle or device. The outlet pipe 23 is connected to a righthand control orifice 28 of a pure fluid amplifier 29 of the type disclosed in the copending patent application of Billy M. Horton entitled "Fluid Amplifier Systems," filed on Sept. 19, 1960, and assigned Ser. No. 51,896. The outlet pipe 24 is connected to a left-hand control orifice 30 of the amplifier 29 and fluid is supplied to a main or power orifice 31 from a suitable source of fluid pressure which may be the same source as that which supplies the fluid to the device 22 or which may be derived directly from the outlet pipes such as the pipes 7 and 8 of the apparatus of FIG. 1.

The amplifier 29 further comprises two outlet passages 32 and 33 defined in part by a divider 34 having its apex 36 directed towards and illustrated for purposes of explanation as lying along the axis of the orifice 31. Under these circumstances, when the pressures in the pipes 23 and 24 are equal, the liquid flowing from the main orifice 31 is divided equally by the divider 34 and equal amounts of the fluid flow to the outlet pipes 32 and 33. The outlet pipe 32 is connected via a pipe 34a to a bellows 36 while the outlet passage 33 is connected via a pipe 37 to a bellows 38. The bellows are aligned along a common axis and their ends opposite to the ends to which pipes 34 and 37 are connected are secured to a plate 39, the bellows being sealed at their ends adjacent the plate 39.

Thus, if the pressures in the pipes 34 and 37 are equal, the bellows 36 and 38 develop equal pressures therein and the plate 39 assumes the position illustrated in FIG. 7. The plate 39 carries a conductive pointer or indicator 41 which is read against a scale 42 having its zero line aligned with the pointer 41 in the position illustrated. The conductive pointer 41 is connected via a wire 42 to one input terminal of a meter 43, the other input terminal of which is grounded. The pointer 41 is adapted to slide along a resistance 44 connected across a voltage source, the center of the resistor 44 being grounded. Thus, when equal pressures are developed on the pipes 34 and 37 and the plate 39 is centered relative to the outer ends of the bellows 36 and 38, the pointer 41 is grounded and the meter 43 which is a center zero scale meter is also centered and indicates no rotation of the apparatus relative to its pitch axis 29a.

If now the vehicle to which the device 22 is secured and with which it is constrained to rotate is rotated about its pitch axis 29a, a differential in pressure is developed in the pipes 23 and 24. Due to the differential in pressure appearing as a result thereof at the inlet orifices 28 and 30, the fluid issuing from the main orifice or nozzle 31 is deflected so that a greater or lesser amount of fluid enters the outlet passage 32 relative to the quantity of fluid entering the outlet passage 33. Taking a specific example, if the vehicle rotates such that the pressure in the pipe 24 is greater than that in the pipe 23, due to relative orientation of the fluid spin axis and the yaw axis Y of device 22, a greater proportion of the fluid issuing from the nozzle 31 is directed to the outlet passage 33 and thence through the pipe 37 to the bellows 38. This causes the plate 39 to shift to the left, this being read directly against the scale 42, and also causes the pointer 41 to move onto a portion of the resistor 44 which is positive relative to ground. As a result, the needle of the meter 43 may be deflected, to the left preferably, indicating also a particular direction of rotation of the vehicle about the pitch axis. The differential in pressure developed between the pipes 23 and 24, as previously indicated, has a magnitude dependent upon the number of degrees of pitch of the craft and the sense of this pressure is a function of the direction of rotation. Thus, the magnitude and sense of deflection of the pointer 41 is a measure of the magnitude and direction of rotation of the vehicle so that the indication read against the scale 42 or the indication provided by the meter 43 reflects this same quantity.

It is to be understood that the output quantities developed may be employed and preferably are employed in control systems for producing a reorientation of the apparatus. Specifically, the signals are employed in a control system which causes a rotation of the vehicle or stable platform opposite to its initial rotation until it has achieved its original position, at which time the spin axis of the fluid in the device 22 is realigned with the yaw axis Y of the device 22 thereby terminating the control signals and removing the control function introduced as a result of their original generation. More particularly, the signals appearing across the differential pressure signal developed in the pipes 23 and 24 may be developed directly in a pneumatic or hydraulic control system for producing a direct function or the output signals developed in the passages 32 and 33 may be employed in a pneumatic or hydraulic control system directly. Further, the movement of the pointer 41 may be employed to control pneumatic or hydraulic control systems or the voltage developed on the lead 42 may be coupled directly into an electrical system for producing control by electrical or electronic means.

Completing the description of the device illustrated in FIG. 7, the pipes 26 and 27 of the device 22 are connected into a measuring circuit 46 identical in every respect with the measuring system described in association with the pipes 23 and 24. The measuring and indication apparatus 46 is connected, however, as indicated immediately above to the pipes 26 and 27 and therefore produces an indication of the magnitude and sense of rotation of the vehicle relative to its roll axis, carrying forward the example originally set forth in FIG. 1. Thus, the system as described can employ a single device of the type illustrated in FIG. 1 through 6 to measure rotation and direction of rotation of a missile or other vehicle relative to its pitch and roll or any two of its axes. If it is desirable, and it usually is, to measure rotation of the vehicle relative to its third, for instance, yaw axis, a second device of the type of the present invention may be employed having an axis of rotation of the fluid aligned with either the pitch or roll axis so that the rotation about the yaw axis may be detected. An identical indicating system may be employed in this portion of the apparatus to provide indications such as those which are provided by the indicating systems of FIG. 7 or the other types of indicating or control systems described above.

As previously indicated, it is normally desirable in a missile, aircraft, submarine, surface vessel or other type of device to employ a control signal having both rate and position information contained therein. As also indicated above, one may employ a differentiating circuit or apparatus in combination with a position measuring apparatus to produce the rate signals which signals may thereafter be combined with the position signals to provide all of the information necessary to produce a stable servoing mechanism. However, it may also be desirable to employ devices for measuring rate of rotation directly and numerous such devices are known. It is preferable, however, in order to provide complete compatibility of measuring and control systems to employ fluid vortex rate measuring devices of the type described in my copending patent applications entitled "Rate Measuring Apparatus," Ser. No. 166,479, filed Jan. 12, 1962.

I claim:

1. A gyroscopic device comprising a vortex amplifier including a hollow, approximately spheroidal body, having an interior surface, means for introducing a fluid into the interior of said body generally tangential to its interior surface and in the plane of a great circle thereof and diametrically opposed fluid outlet means coaxial with a first axis perpendicular to and passing through the center of the plane of the great circle, means adapted to turn said spherical body about a second axis having a component perpendicular to said first axis and means for sensing orientation of the spin axis of the fluid approximately in a plane of a second great circle including said first axis and lying at an angle other than zero degrees to said second axis, said last-named means comprising first means for sensing pressure at two locations approximately on said second great circle and lying along a first line generally perpendicular to said first axis.

2. A gyroscopic device comprising a vortex amplifier including a hollow, approximately spheroidal body, having an interior surface, means for introducing a fluid into the interior of said body generally tangential to its interior surface and in the plane of a great circle thereof and diametrically opposed fluid outlet means coaxial with a first axis perpendicular to and passing through the center of the plane of the great circle, and means for sensing orientation of the spin axis of the fluid upon rotation of said body about an axis lying at an angle to said first axis and at an angle to said great circle, the length of the axis of said body coincident with said first axis being different from the axis of said body perpendicular thereto, said last named means comprising means for sensing the differential in pressure at two locations in said body lying along a line generally perpendicular to the axis of said outlet means.

3. The combination according to claim 2 wherein each of said locations lies along a radius of said body lying at an angle of approximately 45° relative to the plane of said great circle.

4. The combination according to claim 2 wherein each of said locations lies along a radius of said body lying at an angle of approximately 80° relative to the plane of said great circle.

5. The combination according to claim 2 wherein said means for sensing further comprises means for sensing the differential pressure at two locations in said body lying along a further line generally perpendicular to the axis of said outlet means and said first-mentioned line.

6. The combination according to claim 5 wherein said means for sensing comprises still further means for sensing differentials in interior pressures of said body, said still further means being disposed at different circumferential distances from said great circle than said further means.

7. The combination according to claim 2 further comprising an output utilization device including a pure fluid amplifier having opposed inlet apertures and means for applying said differential in pressure across said inlet apertures.

8. A gyroscopic device for sensing rotation of an object comprising a fluid vortex amplifier including a hollow, approximately spheroidal body, means for introducing fluid into the interior of said body generally tangential to its interior surface and in the plane of a great circle thereof, and diametrically opposed fluid outlet means coaxial with a first axis perpendicular to and passing through the center of the great circle and lying at an angle to the axis of the rotation to be sensed, and means for sensing orientation of the spin axis of the fluid relative to the axis of said fluid outlet means, said means for sensing being positioned in a plane lying at an angle to the plane of the great circle of the body and to the axis of the rotation to be sensed, said last named means comprising two pressure sensing means lying on opposite sides of said first axis and displaced at an angle of at least 45° from the plane of the great circle.

9. The combination according to claim 8 wherein said pressure sensing means lie in a plane of a great circle perpendicular to the axis about which rotation is to be sensed.

10. The combination according to claim 1 wherein said means for sensing further comprises second means for sensing pressure at two locations in said body lying along a second line mutually perpendicular to said first axis and said first line.

References Cited

UNITED STATES PATENTS

| | | | |
|---|---|---|---|
| 1,841,606 | 1/1932 | Kollman | 73—704 XR |
| 2,814,487 | 11/1957 | Medkeff | 137—83 XR |
| 2,949,784 | 8/1960 | Maeder | 74—5.7 |
| 2,974,532 | 3/1961 | Goshen et al. | 73—516 |
| 2,980,363 | 4/1961 | Schonstedt | 73—504 XR |
| 2,982,902 | 5/1961 | LeGates | 137—83 XR |
| 2,995,939 | 8/1961 | Munk | 74—5.7 |
| 3,003,512 | 10/1961 | Ziebolz | 137—83 XR |
| 3,004,547 | 10/1961 | Hurvitz | 137—83 |

ROBERT F. STAHL, Primary Examiner

U.S. Cl. X.R.

73—521